(12) United States Patent
Yurgevich

(10) Patent No.: US 6,527,335 B1
(45) Date of Patent: Mar. 4, 2003

(54) METHOD AND APPARATUS FOR COUPLING TRAILER PLATES

(75) Inventor: Howard J. Yurgevich, Chula Vista, CA (US)

(73) Assignee: Hyundai Precision America, Inc., San Diego, CA (US)

( * ) Notice: Subject to any disclaimer, the term of this patent is extended or adjusted under 35 U.S.C. 154(b) by 0 days.

(21) Appl. No.: 09/686,423

(22) Filed: Oct. 11, 2000

(51) Int. Cl.⁷ .............................................. B60R 27/00
(52) U.S. Cl. ...................... 296/181; 296/183; 296/191; 52/584.1; 52/586.1; 52/588.1; 52/309.2
(58) Field of Search ................................. 296/181, 191, 296/183, 196, 197, 29; 220/1.5, 692, 677, 652, 681; 52/464, 461, 459, 395, 467, 468, 470, 471, 584.1, 309.04, 586.1, 588.1, 589.1, 309.1, 309.2

(56) References Cited

U.S. PATENT DOCUMENTS

| | | | |
|---|---|---|---|
| 4,455,803 A | 6/1984 | Kornberger | 52/395 |
| 4,455,807 A | 6/1984 | Ehrlich | 52/770 |
| 4,685,721 A | 8/1987 | Banerjea | 296/181 |
| 4,810,027 A | 3/1989 | Ehrlich | 296/181 |
| 5,058,756 A * | 10/1991 | Green | 220/1.5 |
| 5,066,066 A | 11/1991 | Yurgevich et al. | 296/181 |
| 5,112,099 A | 5/1992 | Yurgevich et al. | 296/181 |
| 5,439,266 A * | 8/1995 | Ehrlich | 296/181 |
| 5,584,252 A * | 12/1996 | Smith et al. | 296/181 X |
| 5,860,693 A * | 1/1999 | Ehrlich | 296/191 |
| 5,934,742 A * | 8/1999 | Fenton et al. | 296/181 |
| 6,003,932 A * | 12/1999 | Banerjea et al. | 296/181 |
| 6,010,020 A * | 1/2000 | Abal | 220/1.5 |

* cited by examiner

Primary Examiner—D. Glenn Dayoan
Assistant Examiner—Lori L Coletta
(74) Attorney, Agent, or Firm—Luce, Forward, Hamilton & Scripps LLP

(57) ABSTRACT

A method and apparatus for coupling trailer plates, wherein each plate has a stepped section. At least two trailer plate receiving areas are located on an outward-facing surface of a substantially rectilinear strip. An inward-facing surface of the trailer plate stepped section is coupled to the receiving area on the substantially rectilinear strip.

28 Claims, 7 Drawing Sheets

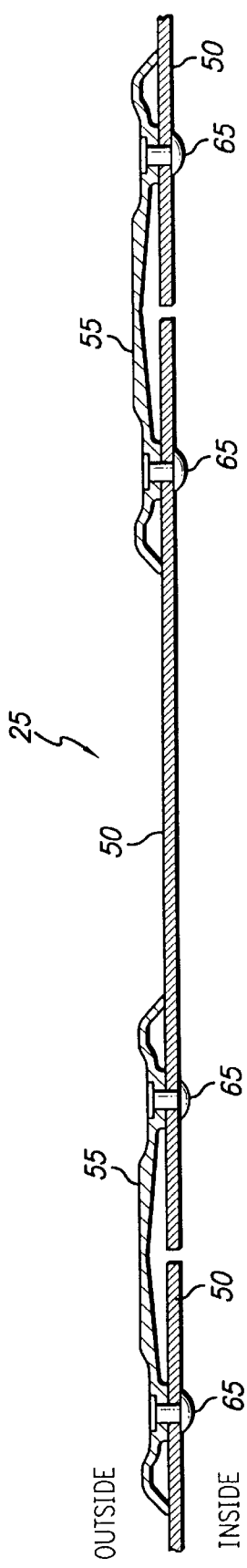
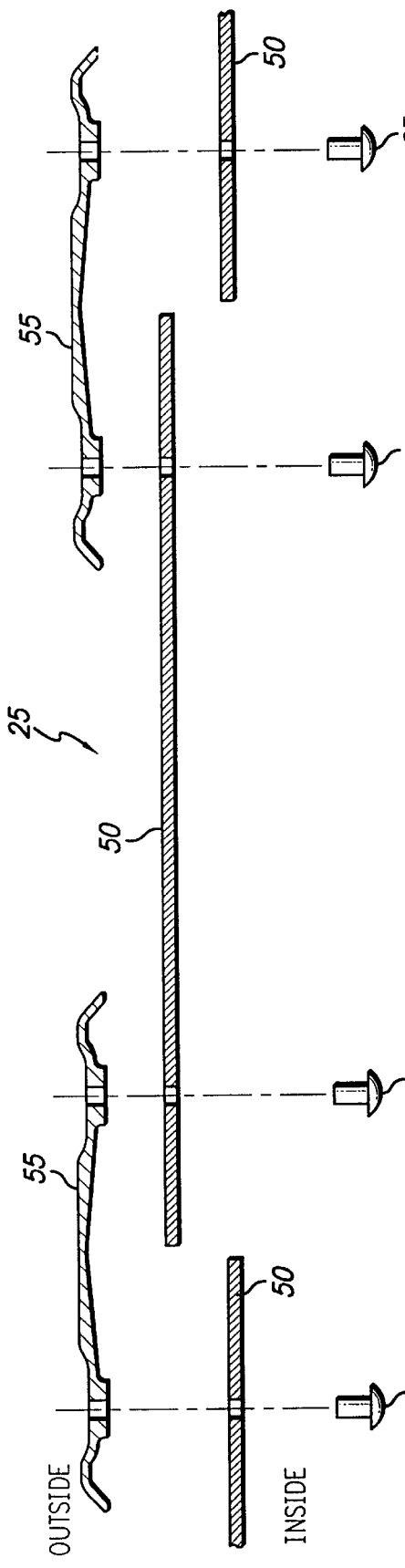
FIG. 4
PRIOR ART
FIG. 4A
PRIOR ART

METHOD AND APPARATUS FOR COUPLING TRAILER PLATES

FIELD OF THE INVENTION

The field of the present invention relates to enclosed trailers and used for the transport of cargo. More particularly, the present invention relates to a plate coupling system for assembling the trailers.

BACKGROUND OF THE INVENTION

Commercial tractors and other types of trucks transport cargo using trailers such as van-type trailers and other types of enclosed trailers. As illustrated in FIG. 1, a van-type trailer 10 includes a floor 15, a roof (not shown) and two sidewalls 25. A front bulkhead 30 and a rear door or doors (not shown) enclose the trailer 10. A king-pin 40 located at a forward area of the trailer 10 couples to a fifth wheel on a tractor and a conventional wheel assembly 35 and front landing gear 45 support the trailer 10.

Federal regulations specify a maximum width 12 of about 102⅜ inches for enclosed trailers 10. Generally, this is measured between the exterior surfaces of the trailer sidewalls 25. In addition, the transport industry has cargo carrying standards that require a width of about 101¼inches inside the trailer 10. This width is generally measured between the interior surfaces of the sidewalls 25. When combined, the Federal and industry requirements define a maximum sidewall thickness 82 of about 9/16 of an inch, shown in FIGS. 2–3. The sidewall thickness 82 is therefore constrained by the limits imposed by both the Federal regulations or the industry standards.

Illustrated in FIGS. 1–3, the sidewalls 25 of conventional van-type or other enclosed trailers are generally constructed of a plurality of generally rectangular plates 50. Each plate 50 is connected by elongaged joiners 55. Fasteners 65 attach the plates 50 to the joiners 55. FIG. 2 illustrates two plates 50 attached to joiner 55 by fasteners 65. Also illustrated in FIG. 2, the sidewall thickness 82 is the sum of the plate thickness 85 and the joiner 55 thickness 80. The outside-facing surface of each joiner 55 is used to define the maximum width of the trailer 10, and the inside-facing surface of each plate 50 is used to define the inner, or enclosed width of the trailer 10.

When the outside-facing surface 70 of each joiner 55 defines the maximum Federally regulated width of the trailer 10, and the inside-facing surface of each the plate 50 defines the minimum industry standard inner width of the trailer 10, if the plate thickness 85 or the joiner thickness 80 is changed, the other member must change to maintain the necessary sidewall thickness 82. For example, it may be advantagous to add a cargo control member to the sidewall 25. A cargo control member is an elongated plate having a plurality of holes and/or slots for attaching straps, hooks and other devices to position and secure the cargo within the trailer 10. Illustrated in FIG. 3, the inclusion of a cargo control member 60 requires a plate thickness 87 that is smaller than the plate thickness 85 of FIG. 2. The larger joiner thickness 89 maintains the required sidewall thickness 82. A thinner sidewall 25 cannot be used, as it does not have the structual strength necessary to restrain the cargo during transportation.

Alternatively, a thicker plate 50 may be installed to increase the structural strength of the sidewall 25 in the area adjacent to the cargo-loading end of the trailer 10. The trailer 10 opening where cargo is loaded can sustain impacts from the cargo or from fork-loaders placing the cargo into the trailer 10. In this instance, the thickness of the joiner 55 must be reduced. Mounting two different thickness plates 50 to one joiner 55 also requires a special joiner 55 because an outside-facing shoulder is created where the different thickness plates 50 meet. The shoulder cannot face the interior of the trailer 10 as it becomes a "snag" point, causing damage to cargo and causing the plates 50 to be more easily damaged. The special joiner 55 must be designed to accommodate that shoulder. Thus, for conventional plate coupling systems, when the plate 50 increases in thickness the joiner 55 must decrease in thickness to maintain the necessary sidewall thickness 82.

During service, the trailer sidewalls 25 can be damaged, requiring replacement of plates 50, joiners 55, or both. FIG. 4 illustrates a section of sidewall 25 constructed of three plates 50 fixed to two joiners 55 using four rows of fasteners 65. In FIG. 4A, replacement of a plate 50 is illustrated. The plate 50 must be removed from the outside of the trailer 10, because the plate 50 extends past the ceiling and floor 15 of the trailer 10 interior. Thus, both joiners 55 must be removed to remove one plate 50. This requires the removal of four rows of fasteners 65. The time and effort necessary to remove four rows of fasteners 65, and two joiners 55 is significant, which reduces trailer availability, negatively affecting cargo delivery schedules.

FIGS. 5 and 5A illustrate a section of sidewall 25 constructed of three plates 50 fixed to two joiners 55 by four rows of fasteners 65, with logistics members 60. In this arrangement, the four rows of fasteners 65, both joiners 55 and both logistics members 60 must be removed to replace the plate 50. Again, this requires substantial time and effort, resulting in trailer downtime.

Therefore, there exists a need for a trailer plate construction system that permits quick replacement of damaged plates and enables the use of thick plates without exceeding Federal regulations while meeting industry cargo carrying standards.

SUMMARY OF THE INVENTION

In order to overcome the deficiencies with known, conventional plate construction systems, a method and apparatus for coupling trailer plates is provided. Briefly, the plate-coupling system of the present invention includes a stepped section located on at least one side of a substantially rectangular trailer plate and an elongated coupler having a plate receiving area. The plate receiving area is configured to receive the trailer plate stepped section.

More specifically, one embodiment of the plate-coupling system employs a substantially rectilinear coupling member comprising an inward-facing and an outward-facing surface. At least two trailer plate receiving areas are located on the outward-facing surface of the rectilinear coupling member. The trailer plate receiving areas are arranged to receive an inward-facing surface of a stepped section of a trailer plate. As defined herein, the outside-facing surface is the surfaces that faces the exterior of the trailer and the inside-facing surface is the surface that faces the interior of the trailer.

Advantageously, the trailer plate coupling system according to the present invention allows the use of increased thickness plates without exceeding Federal trailer width standards. With the present invention, increases in plate thickness do not push the coupling member outward, but rather, the plate is pushed outward. However, the outward-facing surface of the plate does not exceed the outward-facing surface of the coupling member, thereby maintaining a sidewall thickness that meets the Federal regulations and industry standards.

The coupling system according to the invention also permits quick replacement of damaged plates by requiring the removal of the damaged trailer plate only. The coupling member remains attached to the trailer sidewall.

In addition, the coupling system according to the invention also permits plates of different thickness to be coupled adjacent to each other, without the need for special coupling members. Moreover, the coupling system according to the invention can also be used in the construction of intermodal containers, and shipping containers.

BRIEF DESCRIPTION OF THE DRAWINGS

The nature, goals, and advantages of the invention will become more apparent to those skilled in the art after considering the following detailed description when read in connection with the accompanying drawing in which like reference numerals identify like elements throughout wherein:

FIG. 4 is a sectional view taken along the line 4—4 in FIG. 1;

FIG. 4A is a sectional view depicting the removal of a trailer plate illustrated in FIG. 4;

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention.

Figure 6:
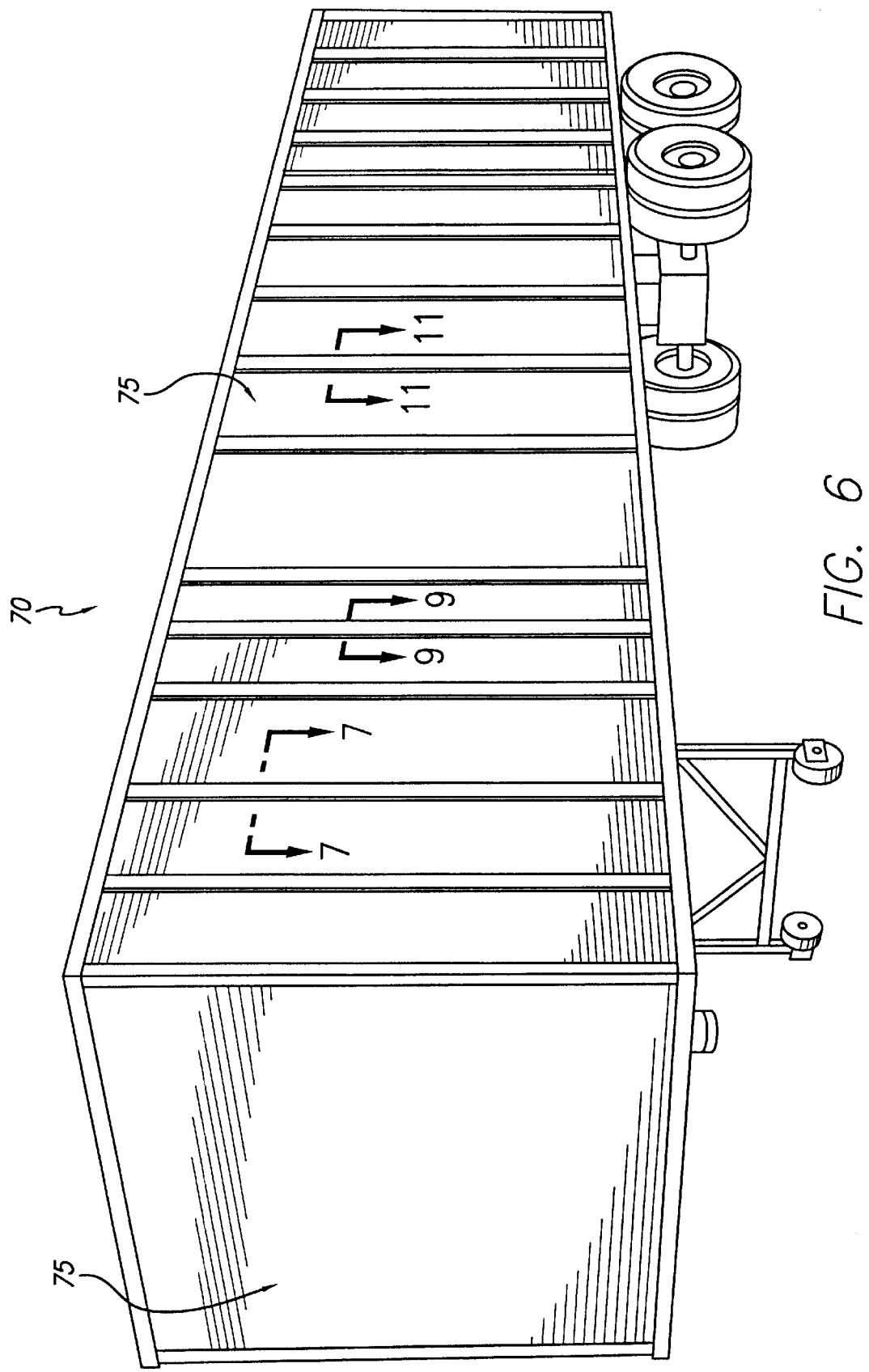
FIG. 6 is a perspective view of a plate trailer constructed according to the present invention.

The disclosed examples of the invention provide an enclosed stepped plate trailer 70, illustrated in FIG. 6, having stepped plate sidewalls 75, with the stepped plate sidewalls 75 constructed by connecting several stepped plates 97. Advantageously, the stepped plates 97 may be thicker than in known trailers, thereby providing advantageous strength and reliability. In addition, different thickness stepped plates 97 can be mounted directly adjacent to each other. Generally, each stepped plate 97 is connected to an adjacent stepped plate 97 by a coupler 90. As described, each stepped plate 97 is substantially rectangular, with a top, a bottom and two side edges. The coupler 90 is a substantially elongated strip with a short top and a short bottom, with two long side edges.

Figure 7:
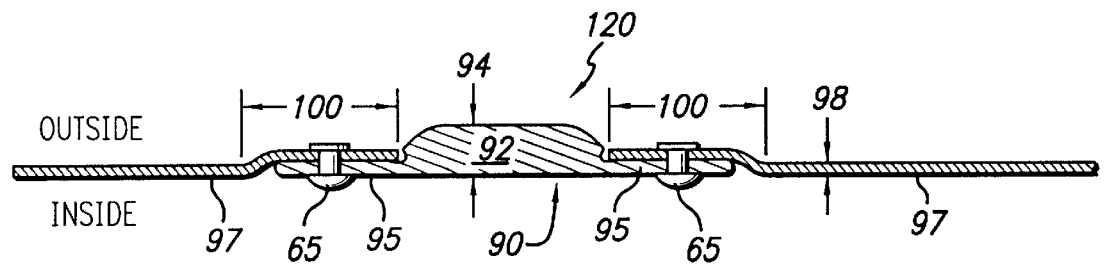
FIG. 7 is a sectional view taken along the line 7—7 in FIG. 6, illustrating one embodiment of the present invention.
Figure 8:
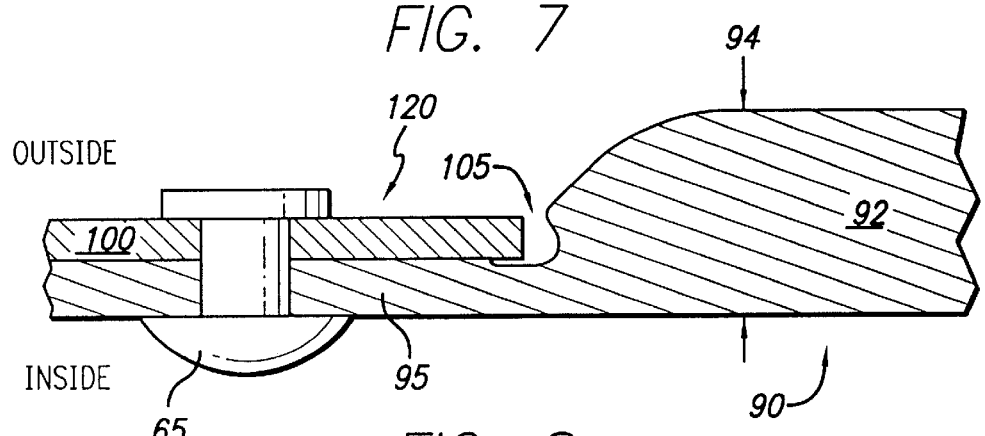
FIG. 8 is a sectional close-up view of the embodiment of FIG. 7.

Referring to FIGS. 7 and 8, a cross-sectional view of one embodiment of the trailer plate coupling system 120 according to the present invention is illustrated. The substantially rectangular stepped plate 97 comprises a stepped section 100 located along a side edge of the plate 97. The stepped section 100 forms a raised area that extends at least along a majority of the side edge of plate 97. The stepped section 100 is structured to mate with a complementary flange 95 that extends from a coupler 90. Preferably, the stepped section is integerally formed with the rest of the plate 97. For example, the stepped section 100 may be formed by bending a recess into a side edge of the plate 97. It will be appreciated that other techniques can be used to form the stepped section 100, or that the stepped section 100 can be formed from discrete parts and joined together. The stepped plate 97 can be constructed of one aluminum plate, two sandwiched aluminum plates with a honeycomb interior, or two sandwiched steel plates with a plastic, or other suitable material positioned between the steel plates. It will be appreciated that other materials can also be employed to construct the stepped plate 97.

The coupler 90 includes a central body 92 from which the flanges 95 extend, and a slot 105 located between the flange 95 and the body 92 for receiving a sealant (not shown) for preventing moisture intrusion into the stepped plate trailer 70. It will be appreciated that the flange 95 could be any complementary mating structure, such as a lip, arm, tab or other suitable structure. Preferably, the coupler 90 is constructed of extruded aluminum, but it will be appreciated that other materials and processes can be used to construct the coupler 90.

A fastener 65 attaches the stepped section 100 of the stepped plate 97 to the coupler 90 flange 95. Preferably, the fastener 65 is a rivet but it will be appreciated that other types of fasteners such as bolts, screws, pins and other suitable fasteners could be used. In addition, attachment of the stepped plate 97 to the coupler 90 could be accomplished by glues, epoxies and other suitable types of attachment methods.

Illustrated in FIGS. 7 and 8, an outside-facing surface of the flange 95 mates with the inside-facing surface of the stepped section 100. As defined herein, an outside-facing surface is the surface that faces the exterior of the trailer stepped plate 70 and an inside-facing surface is the surface that faces the interior of the trailer stepped plate 70. In contrast to conventional arrangements, where the outside-facing surface of the plate 50 meets the inside-facing surface of the joiner, shown in FIGS. 2–5A, the invention places the outside-facing surface of the coupler 92 in contact with the inside-facing surface of the stepped plate 97.

Figure 9:
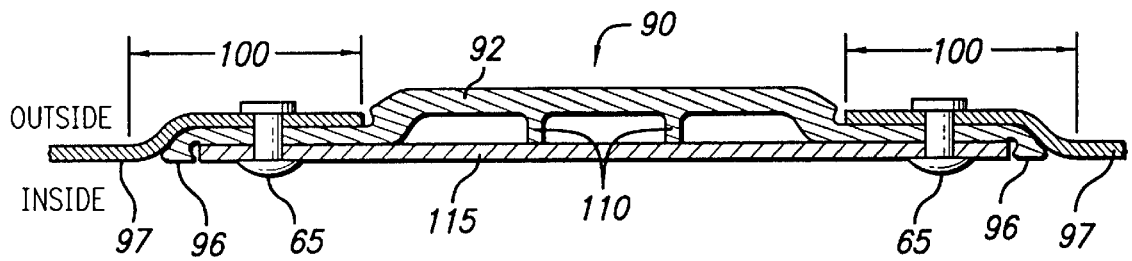
FIG. 9 is a sectional view taken along the line 9—9 in FIG. 6, illustrating another embodiment of the present invention.
Figure 10:
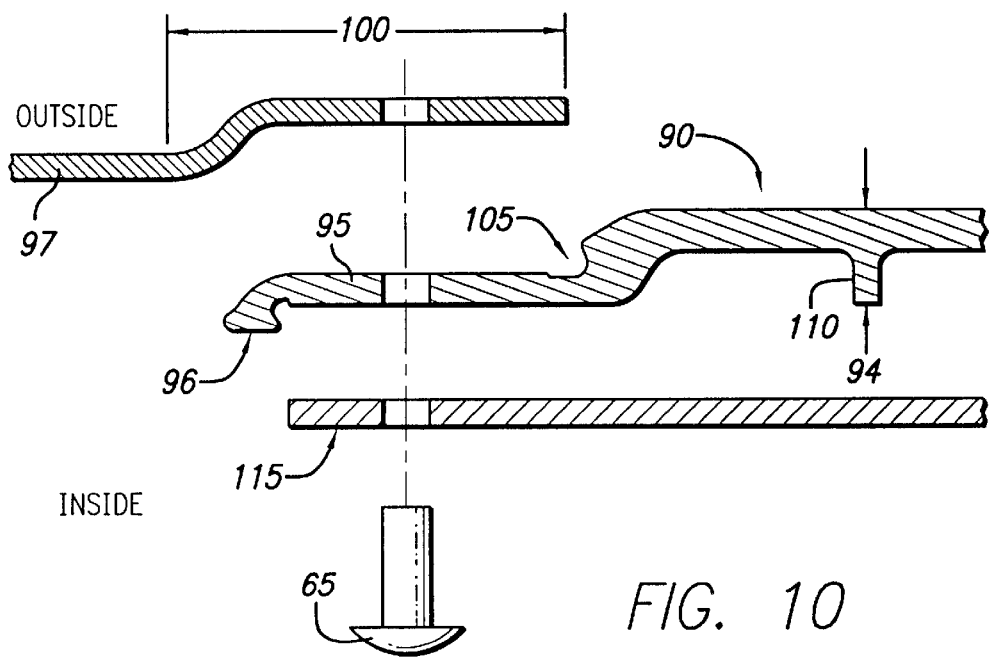
FIG. 10 is a sectional close-up view of the embodiment of FIG. 9.

Referring to FIGS. 9 and 10, a cross-sectional view of an alternative embodiment of the present invention is illustrated. The coupler 90 has a central body 92 that includes ribs 110 for supporting a cargo control panel 115. It will be appreciated that alternative embodiments of the coupler 90 may not include the ribs 110. The cargo control panel 115 faces the inside of the stepped plate trailer 70 and contains slots and/or holes for securing hooks, bars, straps, or other types of devices for positioning and securing the cargo to the interior of the stepped plate trailer 70. Alternatively, a reinforcement plate (not shown) can replace the cargo control panel 115. The reinforcement plate is substantially identical to the cargo control panel 115 except that it does not contain any holes and/or slots for the cargo control devices. The reinforcement plate increases the structual strength, or bending stiffness of the coupler 90. The cargo control panel 115 also increases the structual strength of the coupler 90, but to a lesser degree than the reinforcement plate because of the holes and slots that are cut out of the cargo control panel 115.

In the embodiment illustrated in FIGS. 9 and 10, the stepped plate 97 has a stepped section 100 that is attached to the coupler 90 by fasteners 65. Illustrated in FIG. 10, the flange 95 has a slot 105 for receiving sealant and a flange tip 96 that prevents cargo from catching on the edge of the reinforcement or cargo control panel 115. It will be appreciated that alternative embodiments of the coupler 90 may not include the flange tip 96. Also illustrated in FIG. 10, an inside-facing surface of the panel 97 engages an outside-facing surface of the coupler 90.

Figure 11:
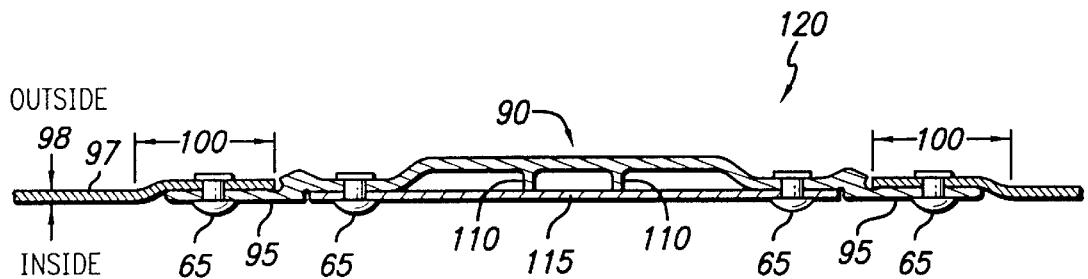
FIG. 11 is a sectional view taken along the line 11—11 in FIG. 6, illustrating a third embodiment of the present invention.
Figure 12:
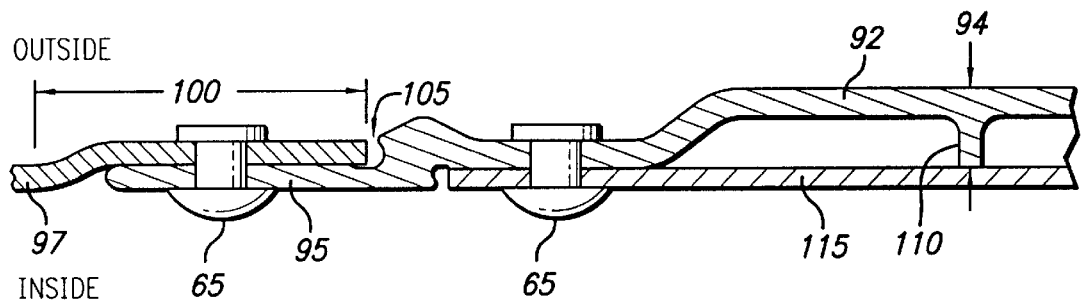
FIG. 12 is a sectional close-up view of the embodiment of FIG. 11.

FIGS. 11 and 12, illustrate a cross-sectional view of a third embodiment of the present invention. The coupler 90 includes an extended flange 95 that accommodates two fasteners 65 on each flange 95. A reinforcement or cargo control panel 115 is secured by two fasteners 65 and another pair of fasteners 65 attach the panel 97 to the coupler 90. In FIG. 12, slot 105 is illustrated, which may receive sealant for preventing moisture intrusion into the stepped plate trailer 70.

Generally, construction of a sidewall 75 according to the present invention will begin with the forming a stepped section 100. This can be accomplished by employing a stamping process, or other suitable process. It will be appreciated that other methods and processes can be used to form the stepped section 100. After forming, the stepped section 100 is placed adjacent to the coupler 90, with the stepped section 100 located over the flange 95. Fasteners 65 are inserted through corresponding holes in both the stepped section 100 and flange 95, thereby joining the stepped plate 97 to the coupler 90.

Figure 13:
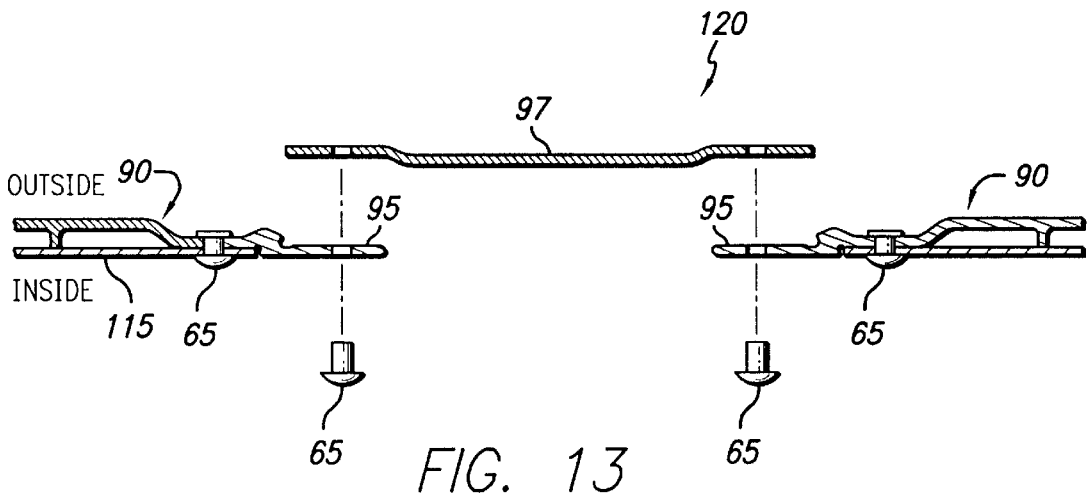
FIG. 13 is a sectional view depicting the removal of a trailer plate illustrated in FIG. 11.

FIG. 13 illustrates the replacement of a damaged stepped plate 97. In contrast to conventional replacement procedures, illustrated in FIGS. 4A and 5A, replacement of a stepped plate 97 only requires removal of the stepped plate 97—not the adjacent couplers 90. In this embodiment, two rows of fasteners 65 are removed, and couplers 90 remain attached to the stepped plate sidewall 75. Hence, the number of fasteners 65 that must be removed is reduced by 50% when compared to conventional replacement procedures. Similarly, only half the number of fasteners 65 must be reinstalled when attaching a new stepped plate 97. This translates into a significant reduction in the amount of time and effort required to replace damaged plates, thereby decreasing trailer repair time.

Figure 1:
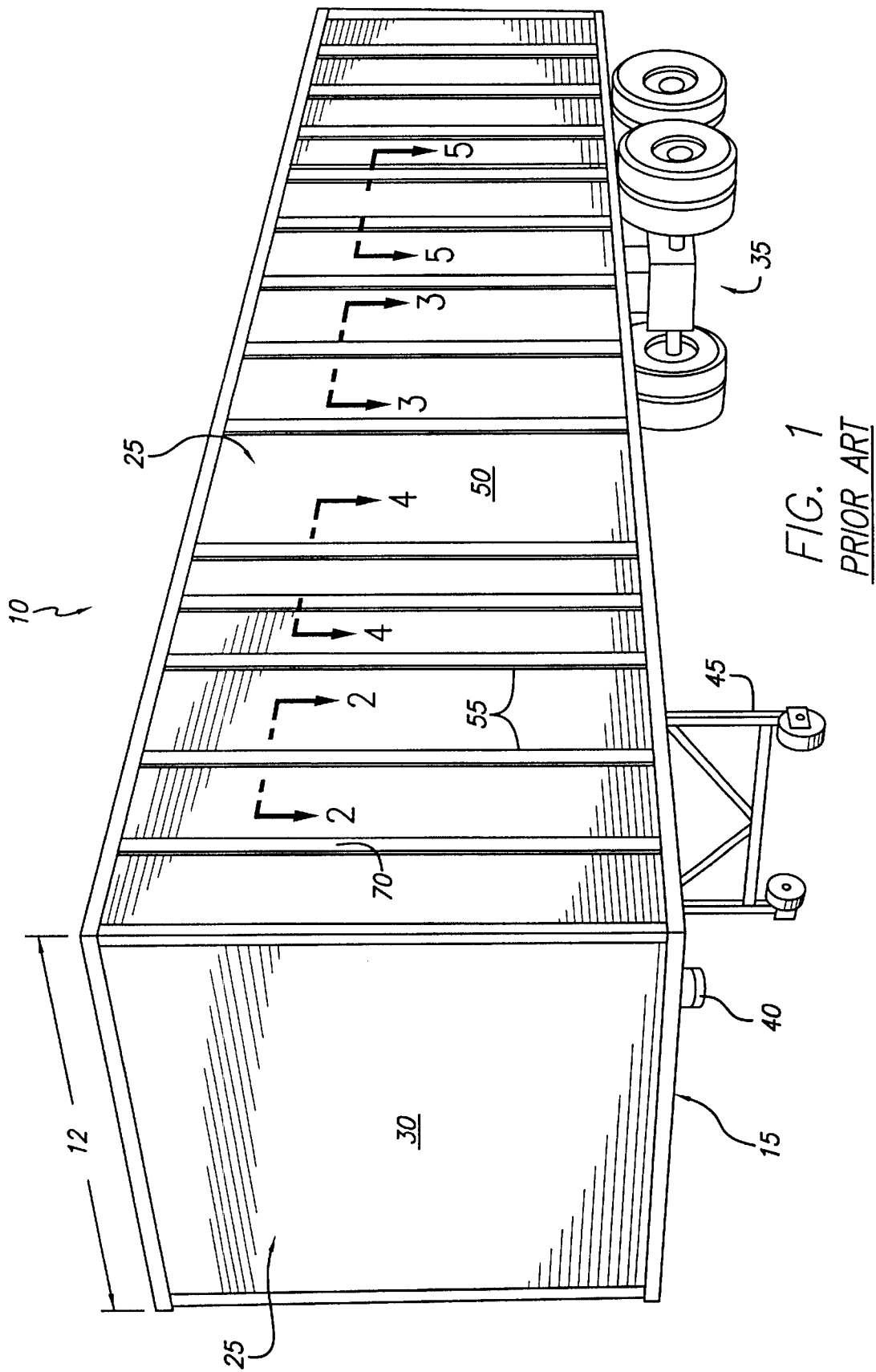
FIG. 1 is a perspective view of a conventional plate trailer.
Figure 2:
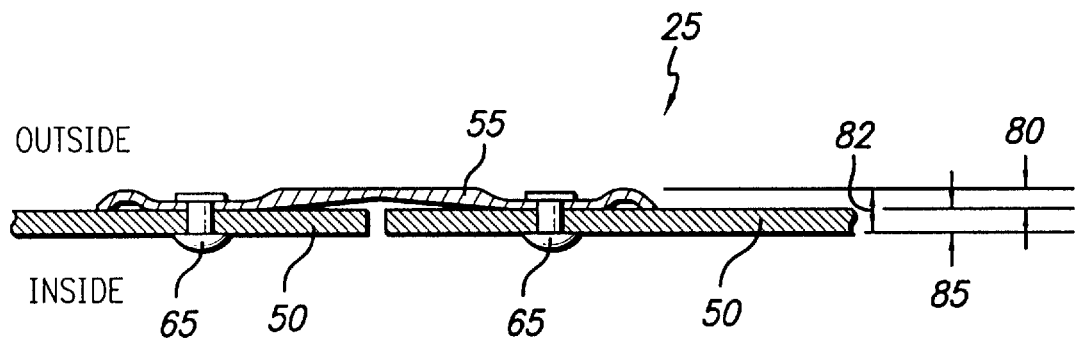
FIG. 2 is a sectional view taken along the line 2—2 in FIG. 1.
Figure 3:
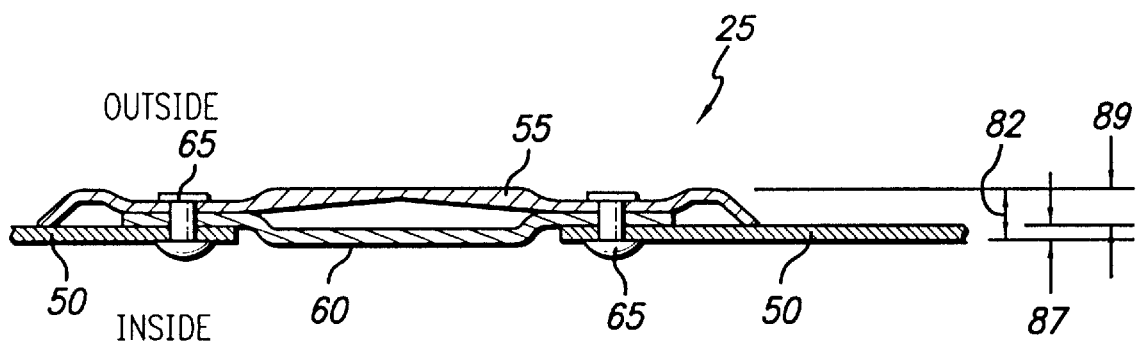
FIG. 3 is a sectional view taken along the line 3—3 in FIG. 1.
Figure 5:
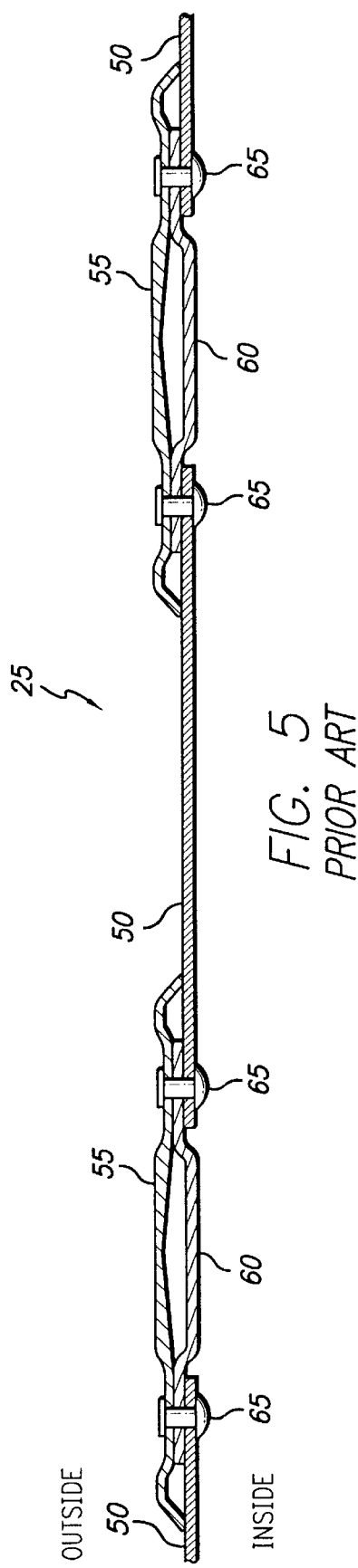
FIG. 5 is a sectional view taken along the line 5—5 in FIG. 1.
Figure 5A:
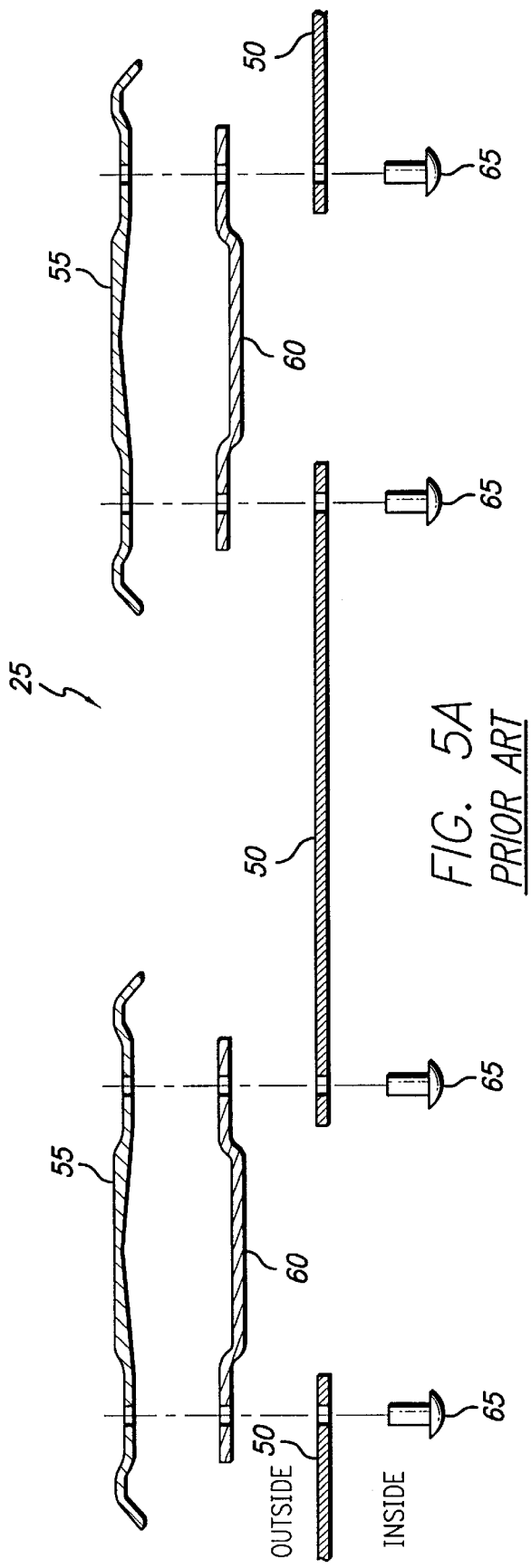
FIG. 5A is a sectional view depicting the removal of a trailer plate illustrated in FIG. 5.

In addition to simplification of repair, the present invention possesses several other advantages. For example, in conventional trailer construction systems, any change to the thickness of the plate 50 or the joiner 55 requires a corresponding change to the thickness of the other member, as shown in FIGS. 2–3. This is necessary because of the strict sidewall thickness 82 requirements imposed by industry standards and Federal regulations. With conventional trailer plate joining systems the joiner 55 is pushed outward, or away from the stepped plate trailer 70 when thicker plates 50 are installed. This is because the joiner 55 mounts to the outside-facing surface of the plate 50. Put differently, the joiner 55 is positioned on top of the plate 50.

However, this is not the case in the present invention. Referring to FIG. 7, the stepped plate 97 is positioned on top of the coupler 90. That is because the inside-facing surface of the stepped plate 97 mounts to the outside-facing surface of the coupler 90. Therefore, the outside-facing surface of the stepped plate 97 is pushed outward, or away from the stepped plate trailer 70 when a thicker stepped plate 97 is installed. Therefore, the thickness of the sidewall measured from the inside-facing surface of the stepped plate 97 to the outside-facing surface of the coupler 90 does not change because, as illustrated in FIGS. 7 and 8, the coupler body 92 is the thickest part of the stepped plate sidewall 75. Generally, the coupler body thickness 94 can range from about 0.4 inches to about 0.563 inches, and the stepped plate thickness 98 can range from about 0.06 inches to about 0.2 inches.

Employing the above-described stepped plate system, changes to the thickness of the stepped plate 97 can be made without changing the thickness of the coupler 90. In operation, the thickness of the stepped plate 97 can increase until the outside-facing surface of the stepped section 100 aligns with the outside-facing surface of the coupler body 92. Therefore, stepped plates 97 of substantial thickness can be attached to the coupler 90 without exceeding the stringent sidewall thickness 82 demanded by federal regulations and industry standards.

In addition, the present invention now allows for stepped plates 97 of different thickness to be mounted directly adjacent to each other. This feature is advantageous because thick stepped plates 97 can be mounted near the open-end of the stepped plate trailer 70, or in high-stress areas such as around the kingpin 40, landing gear 45, or in areas used to lift the trailer 70, where increased structural strength is desired. Thinner stepped plates 97 can be used in the remaining areas of the stepped plate trailer 70, thereby reducing construction cost and trailer weight.

One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. An apparatus for coupling at least two trailer plates in an enclosure comprising:
    a substantially rectilinear member comprising an inward-facing surface and an outward-facing surface; and
    at least two trailer plate receiving areas located on the rectilinear member outward-facing surface;
    wherein the trailer plate receiving areas are arranged to receive an inward-facing surface of the trailer plates; and
    wherein the inward-facing surface is in communication with the interior of the enclosure.

2. The apparatus of claim 1, wherein the rectilinear member and the trailer plate inward-facing surfaces face a trailer interior.

3. The apparatus of claim 1, wherein the rectilinear member and the trailer plate outward-facing surfaces face a trailer exterior.

4. The apparatus of claim 1, wherein the rectilinear member comprises at least two flanges that extend from an elongated body.

5. The apparatus of claim 1, wherein the trailer plate receiving areas comprise at least two flanges that extend from the rectilinear member.

6. The apparatus of claim 1, wherein the rectilinear member comprises at least two flanges that extend from an elongated body, each flange including a flange tip located at an end of the flange.

7. The apparatus of claim 1, wherein the rectilinear member comprises at least two flanges and at least two ribs that extend from an elongated body, the ribs structured to support at least one of a cargo control member and a reinforcement member.

8. The apparatus of claim 1, further including at least one of a cargo control member and a reinforcing member coupled to the rectilinear member.

9. A trailer body comprising:
   a stepped section located on at least one side of a substantially rectangular trailer plate;
   an elongated interior joining member; and
   an elongated member comprising a trailer plate receiving area, the trailer plate receiving area configured to receive the trailer plate stepped section;
   wherein the trailer plate receiving area is positioned between the stepped section and the interior joining member.

10. The trailer body of claim 9, wherein the trailer plate receiving area faces away from an enclosed area of the trailer body.

11. The trailer body of claim 9, wherein the stepped section is located at a periphery of the substantially rectangular trailer plate.

12. The trailer body of claim 9, wherein the trailer plate composition is selected from the group consisting of: sandwiched honeycomb plate; aluminum plate; and plastic filled sandwich steel plate.

13. The trailer body of claim 9, wherein the elongated member comprises at least two flanges and a rib that extends from an elongated body, with each flange including a flange tip located at an end of the flange.

14. A trailer body comprising:
   a stepped section located on at least one side of a substantially rectangular trailer plate; and
   an elongated member comprising a trailer plate receiving area, the trailer plate receiving area configured to receive the trailer plate stepped section;
   wherein the elongated member comprises at least two flanges and at least two ribs that extend from an elongated body, the ribs structured to support at least one of a cargo member and a reinforcement member.

15. The trailer body of claim 9, wherein the elongated member comprises a slot structured to receive a sealant.

16. The trailer body of claim 9, further including at least one of a cargo control member and a reinforcement member coupled to the elongated member.

17. A method of constructing a container having an inside and an outside, the method comprising the steps of:
   providing a container plate;
   forming a stepped section on the container plate;
   positioning at least part of the stepped section adjacent to a plate receiving area located on an elongated joining member; and
   fastening the stepped section to the plate receiving area so that an inside-facing surface of the stepped section contacts an outside-facing surface of the plate receiving area
   wherein the elongated joining member comprises at least two flanges and at least two ribs that extend from an elongated body, the ribs structured to support at least one of a cargo member and a reinforcement member.

18. The method of claim 17, wherein the container is selected from the group consisting of: enclosed trailers, van-type trailers, intermodal containers, shipping containers and ISO marine containers.

19. An apparatus for coupling at least two trailer plates comprising:
   a substantially rectilinear member comprising an inward-facing surface and an outward-facing surface; and
   at least two trailer plate receiving areas located on the rectilinear member outward-facing surface;
   wherein the trailer plate receiving areas are arranged to receive an inward-facing surface of the trailer plates;
   wherein the trailer plate receiving area comprises a flange that extends from an elongated body; and
   further including a slot located between the flange and the elongated body.

20. A trailer body comprising:
   a stepped section located on at least one side of substantially rectangular trailer plate;
   an interior panel; and
   an elongated member comprising a trailer plate receiving area, the trailer plate receiving area configured to receive the trailer plate stepped section;
   wherein the trailer plate receiving area comprises a flange that extends from an elongated body;
   wherein the flange is sandwiched between the stepped section and the interior panel.

21. A method of constructing a container having an inside and an outside, the method comprising the steps of:
   providing a container plate;
   providing an interior panel;
   forming a stepped section on the container plate;
   positioning at least part of the stepped section adjacent to a plate receiving area located on an elongated joining member; and
   fastening the stepped section to the plate receiving area so that an inside-facing surface of the stepped section contacts an outside-facing surface of the plate receiving area;
   wherein the trailer plate receiving area comprises a flange that extends from an elongated body and a slot located between the flange and the elongated body.

22. The apparatus of claim 1, wherein two of said trailer plates are coupled using a single said substantially rectilinear member.

23. The apparatus of claim 1, wherein said substantially rectilinear member is elongated and includes an irregular cross-sectional profile.

24. The apparatus of claim 19, wherein said substantially rectilinear member is elongated and includes an irregular cross-sectional profile.

25. An apparatus coupling at least two plates of an enclosure comprising:
   an elongated member comprising an inward-facing surface and an outward-facing surface; and at least two plate receiving areas located on the elongated member outward-facing surface;

wherein the plate receiving areas are arranged to receive an inward-facing surface of the trailer plates; and wherein the inward-facing surface is in communication with the interior of the enclosure.

26. An apparatus coupling at least two plates of an enclosure comprising:

an elongated member including:
 an inward-facing surface;
 an outward-facing surface;
 at least two flanges and at least two ribs extending from the elongated member, the rib structured to support at least one of a cargo control member and a reinforcement member;
 at least two plate receiving areas located on the elongated member outward-facing surface; and wherein the plate receiving areas are arranged to receive an inward-facing surface of the trailer plates.

27. An enclosure comprising:

a plate member having a stepped section on at least one side of thereof;

a first elongated joining member; and a second elongated joining member including a plate member receiving area, the plate member receiving area configured to receive at least one of said stepped sections;

wherein the trailer plate receiving area is positioned between the stepped section and the first elongated joining member.

28. The enclosure of claim 26 wherein the second elongated joining member comprises at least two flanges and at least two ribs that extend from an elongated body, the ribs structured to support at least one of a cargo member and the first elongated joining member.

* * * * *